United States Patent [19]
Heller

[11] Patent Number: 5,911,827
[45] Date of Patent: Jun. 15, 1999

[54] APPARATUS FOR COATING FOOD PRODUCTS WITH SAUCE

[75] Inventor: Peter Heller, Augustdorf, German Dem. Rep.

[73] Assignee: Peter Heller GmbH, Augustdorf, Germany

[21] Appl. No.: 09/007,549

[22] Filed: Jan. 15, 1998

[30] Foreign Application Priority Data

Jan. 15, 1997 [DD] German Dem. Rep. .......... 197011578

[51] Int. Cl.⁶ .................................................. A23G 3/00
[52] U.S. Cl. .............................. 118/19; 118/20; 118/24; 118/28; 118/29; 118/69; 118/320; 118/416; 118/417; 99/517
[58] Field of Search ................................. 118/19, 20, 24, 118/28, 29, 69, 416, 417, 320; 99/517, 348; 426/302, 295, 524

[56] References Cited

U.S. PATENT DOCUMENTS

| 3,607,313 | 9/1971 | Roth ........................................ 426/302 |
| 4,326,480 | 4/1982 | Glatt ......................................... 118/19 |
| 4,478,861 | 10/1984 | Montgomery et al. .................. 426/524 |
| 5,589,214 | 12/1996 | Palm ....................................... 426/524 |

FOREIGN PATENT DOCUMENTS 4141448  6/1993  Germany .

*Primary Examiner*—Laura Edwards
*Attorney, Agent, or Firm*—Richard M. Goldberg

[57] ABSTRACT

An apparatus for coating food products with sauce while simultaneously deep freezing them comprises a rotatable drum (10) in a horizontal position, on the inner wall surface of which a driving plate is disposed and which has an opening (16) at an end face. The apparatus furthermore comprises a second opening (18) on the opposite end face, an ejector, which is provided at the driving plate (88) and disposed in front of the second opening (18), a nozzle (80, 84, 86), mounted in the first opening (16), for feeding a coolant, particularly in the form of liquid nitrogen or liquid carbon dioxide, into the drum, a further nozzle, mounted in the first opening (16), for injecting sauce into the drum, an exhaust pipe, which occupies essentially the whole cross sectional area of the first opening (16) and is intended to exhaust gaseous coolant, as well as a movable holding device (42, 44), which accommodates the exhaust pipe (34, 28) and permits the exhaust pipe to be moved between a position immediately in front of the first opening and a retracted position.

20 Claims, 7 Drawing Sheets

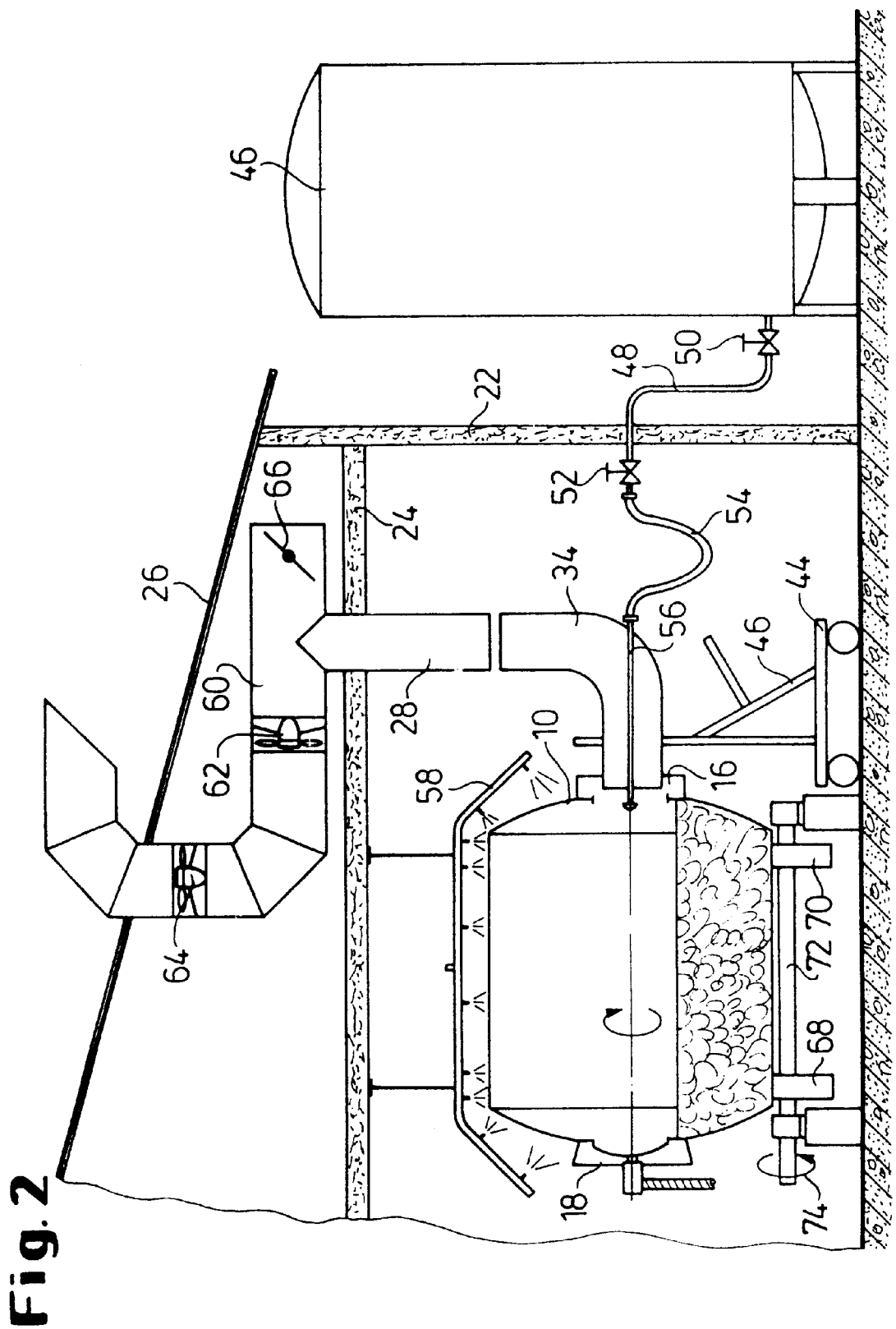

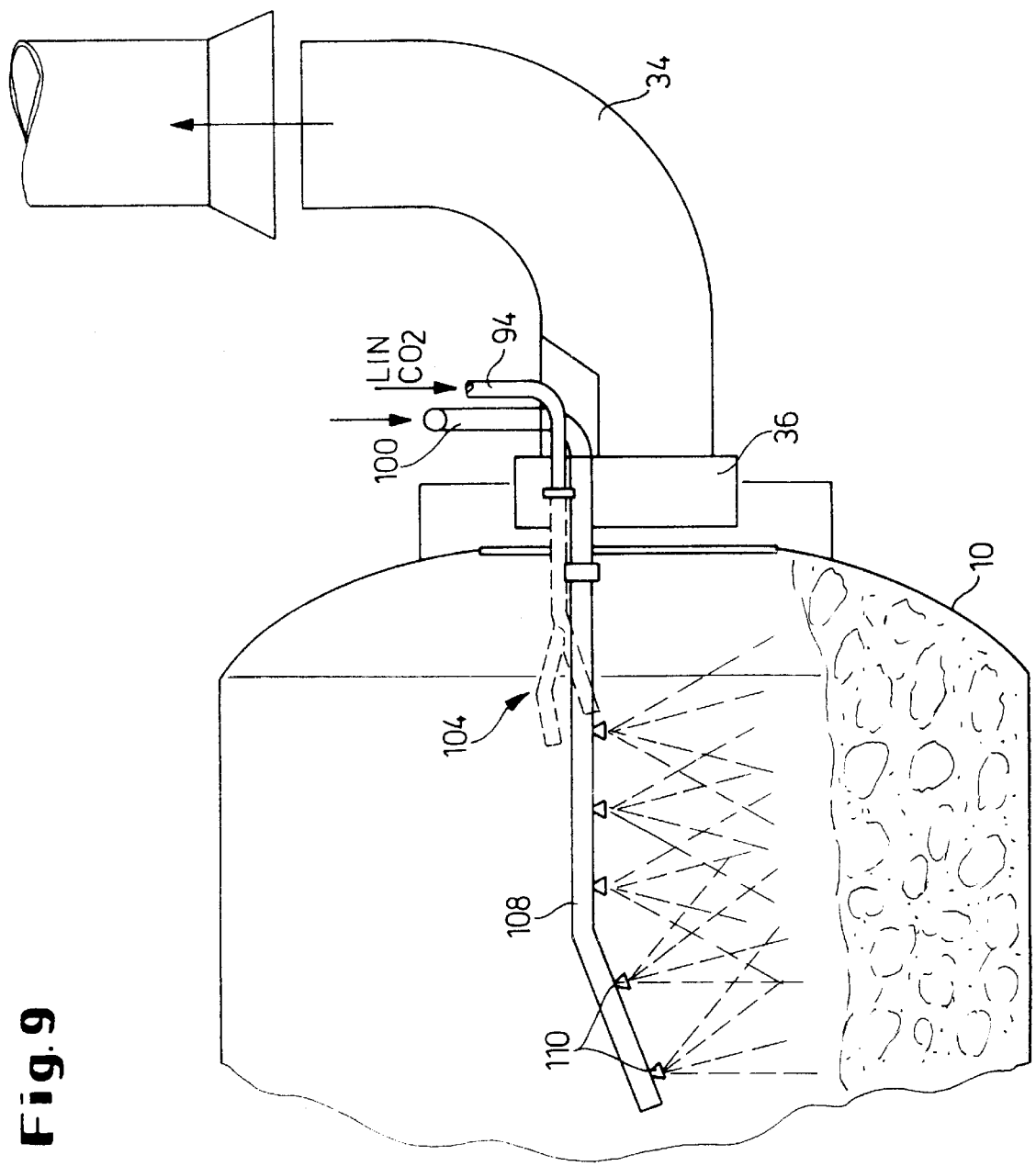

APPARATUS FOR COATING FOOD PRODUCTS WITH SAUCE

BACKGROUND OF THE INVENTION

The invention relates to an apparatus for coating food products with sauce while simultaneously deep freezing them, with a rotatable drum in a horizontal position, on the inner wall surface of which a driving plate is disposed and which has an opening at an end face.

Previously, it has not been possible satisfactorily to combine different, cooked food products, such as noodles, rice, vegetables, potatoes or meat in the deep frozen state, firmly with a sauce, particularly when the proportion of sauce was to be higher than 4%. However, this would be desirable, since it would offer the possibility of dividing the contents of a package of the product into individual portions, which would always have same consistency and composition. It would then be possible to dispense with mixing all the contents of a package before consumption. In practice, it is therefore customary for the manufacturer either to offer the whole product as a frozen block or to add some larger, frozen pieces of the sauce portion in block form to the package.

Admittedly, attempts have been made to freeze food products in horizontally positioned, relatively long drums with the help of liquid nitrogen or liquid carbon dioxide and, at the same time, to provide them with a sauce coating. Up to now, however, results have been unsatisfactory. It was possible to achieve uniform adhesion of the sauce only to a limited extent. The problems, which arose, obviously were based essentially on the fact that it was not possible to cool the goods quickly enough. For the previously used, relatively long drums with only one filling and discharging opening at an end face, there was an ejector, for ejecting the goods after the cooling process, at the driving plate in the region of the opening. This resulted in relatively confined space relationships, which counteracted particularly the rapid introduction of the coolant. However, if the cooling does not take place quickly enough, not only is the adhesion of the sauce to the products limited, but there may also be agglomeration and adhesion or even breakage of the goods, such as cooked rice or noodles.

SUMMARY OF THE INVENTION

It is an object of the invention to provide an apparatus of the above type, which permits food products to be deep frozen rapidly with an accurately definable temperature-time profile and, at the same time, to provide such food products with a firmly adhering coating of sauce.

Pursuant to the invention, this objective is accomplished by an apparatus of the initially named type, which is characterized by a second opening on the opposite end face, an ejector, which is provided at the driving plate and disposed in front of the second opening, a nozzle, mounted in the first opening, for feeding a coolant, particularly in the form of liquid nitrogen or liquid carbon dioxide, into the drum, a further nozzle, mounted next to the first opening, for injecting sauce into the drum, an exhaust pipe, which occupies essentially the whole cross sectional area of the first opening and is intended to exhaust gaseous coolant, as well as a movable holding device, which accommodates a section of the exhaust pipe and permits the exhaust pipe to be moved between a position immediately in front of the first opening and a retracted position.

Since the drum has two openings on two opposite sides, both openings can be tailor-made particularly for the functions of filling and discharging the products. The ejector, provided in front of the second opening, enables the products to be delivered rapidly after the treatment, but does not impede the rapid injection of coolant and sauce on the opposite side.

An important advantage of the invention lies in the arrangement of the exhaust pipe which, in the interest of rapid exhaustion of the gaseous coolant, has large dimensions, on a movable holding device in front of the first opening. With this holding device, the exhaust pipe, at the end of an operating cycle, can be moved to the side, so that the working space in front of the drum is free and new material can be filled into the drum. A movable carriage, a swiveling arm, a lifting device or the like comes into consideration as the holding device.

The nozzles or lances for injecting coolant and sauce are mounted, pursuant to the invention, readily accessibly at the exhaust pipe or at a collar surrounding the end of the exhaust pipe. This enables the nozzles to be exchanged easily and handled readily. The food products are tumbled continuously in the drum by the driving plate and, at the same time, coated uniformly with sauce (coating) and deep frozen.

Largely conventional nozzles are used for the injection of liquid nitrogen as coolant and also for the injection of sauces. On the other hand, when carbon dioxide is used as coolant, a so-called snow pipe is used, into one end of which liquid carbon dioxide enters and which is open at the other end for discharging carbon dioxide snow into the interior of the drum.

BRIEF DESCRIPTION OF THE DRAWINGS

In the following, preferred examples of the invention are described in greater detail by means of the attached drawing, in which.

DETAILED DESCRIPTION

Figure 1:
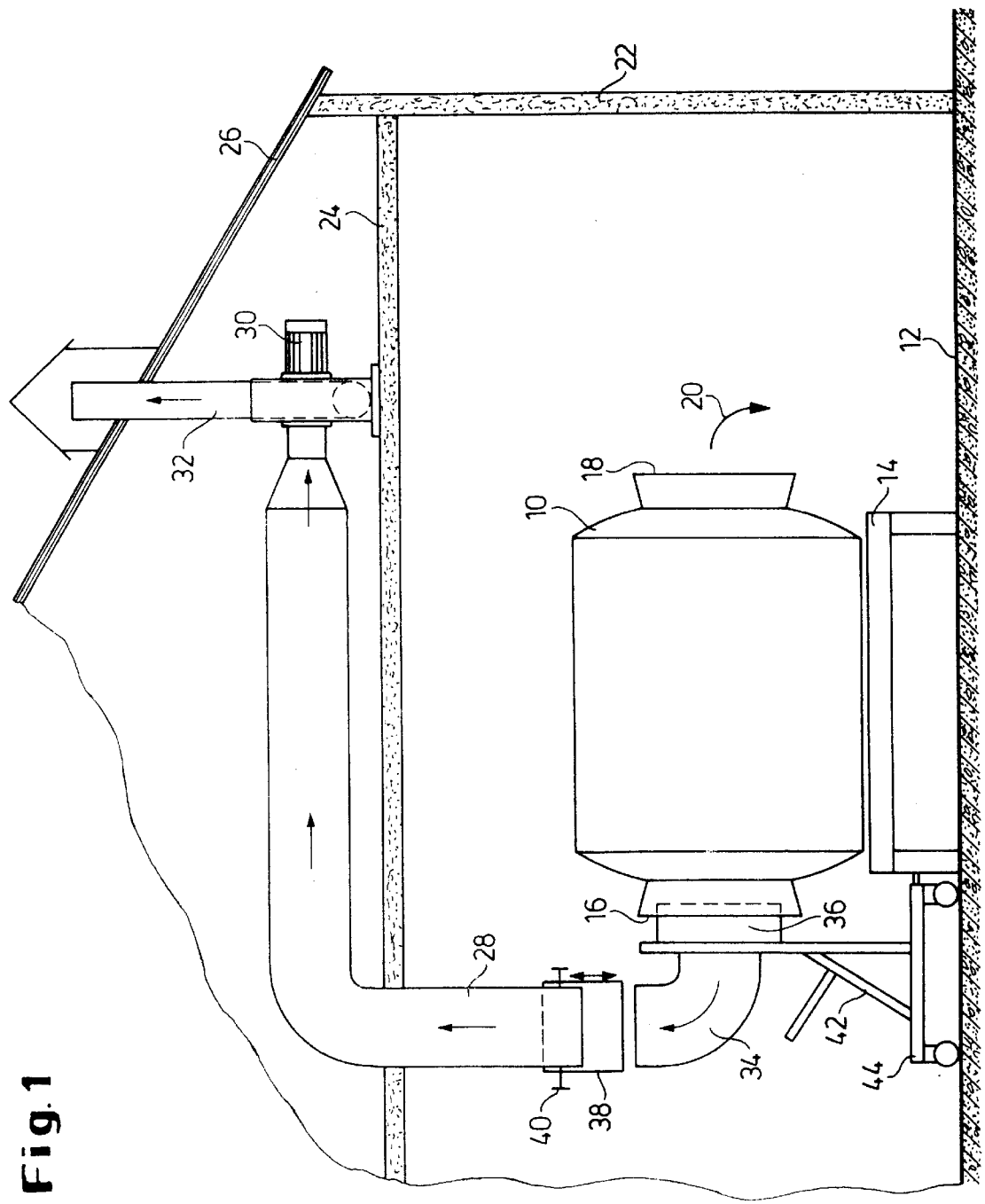
FIG. 1 is a diagrammatic representation of an inventive apparatus within a partially indicated production building.

In FIG. 1, an inventive drum is labeled 10. The drum stands on the floor 12 of a production building and is supported by a frame 14, which is provided, in a manner not shown, with supporting and driving rollers for the drum, which permit the drum to be rotated. On the left side and on the right side, the drum 10 has end openings 16 and 18 at both ends, which should be referred to as the first and the second openings. The second opening forms the discharging opening for finished product, as indicated by arrow 20.

To further illustrate the production building, an outer wall 22 is shown, which supports a false ceiling 24 as well as a roof 26. The left opening 16 of the drum 10, which is on the left in FIG. 1, serves, on the one hand, for filling material into the drum and, on the other, during the operating process, for exhausting evaporating coolant, particularly nitrogen or carbon dioxide. Since rapid and intensive exhausting is necessary in order to avoid an overpressure in the drum, the opening 16 is connected with an exhaust pipe 28 of relatively large cross section during the operating process. For the example shown, this exhaust pipe passes through the false ceiling 24 upwards and then sideways to a blower 30, the outlet pipe 32 of which emerges upwards from the roof 26.

During the exhausting process, the exhaust pipe 28, which runs perpendicularly downwards through the false ceiling 24, is connected at its lower end with a pipe elbow 34, one end of which is surrounded by a collar 36. During the exhaustion, this collar 36 lies in the funnel-shaped opening 16 with clearance all around. The connection between the exhaust pipe 28 and the pipe elbow 34 during an exhaustion process can be brought about by a sliding sleeve 38 on the lower end of the exhaust pipe 28. After clamping screws 40 have been loosened, the sliding sleeve 38 can be lowered so far in relation to the exhaust pipe, that it laps over the outwardly directed section of the pipe elbow 34.

The pipe elbow 34, together with the collar 36, is supported on a frame 42, which can be moved on a carriage 44. After a batch of material is finished, the pipe sleeve 38 is pushed up on the exhaust pipe 28 and clamped and, subsequently, the carriage 44, together with the frame 42, the pipe elbow 34 and the collar 36 can be moved to the side, so that the opening 16 is freely accessible and a new batch of material can be introduced. The accessibility, moreover, is also advantageous for cleaning, maintenance and repair work.

Figure 2:
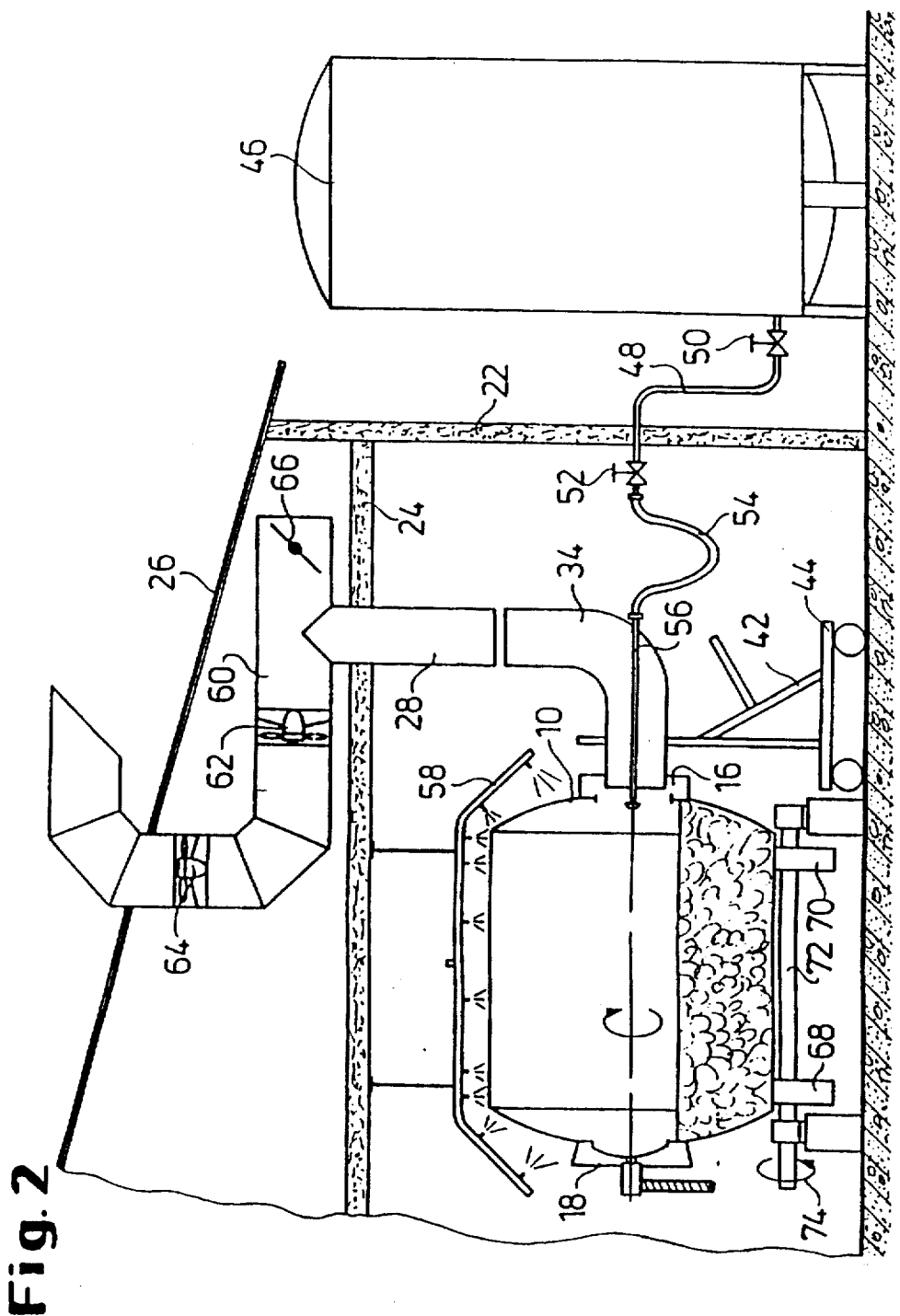
FIG. 2 shows a different embodiment of a similar plant.
Figure 5:
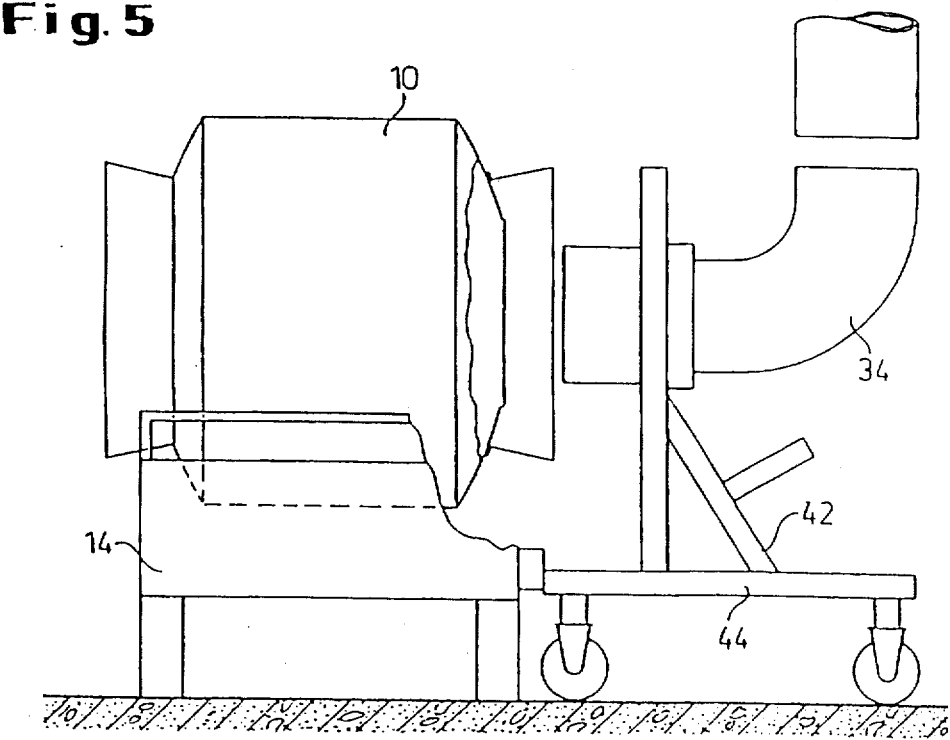
Figure 6:
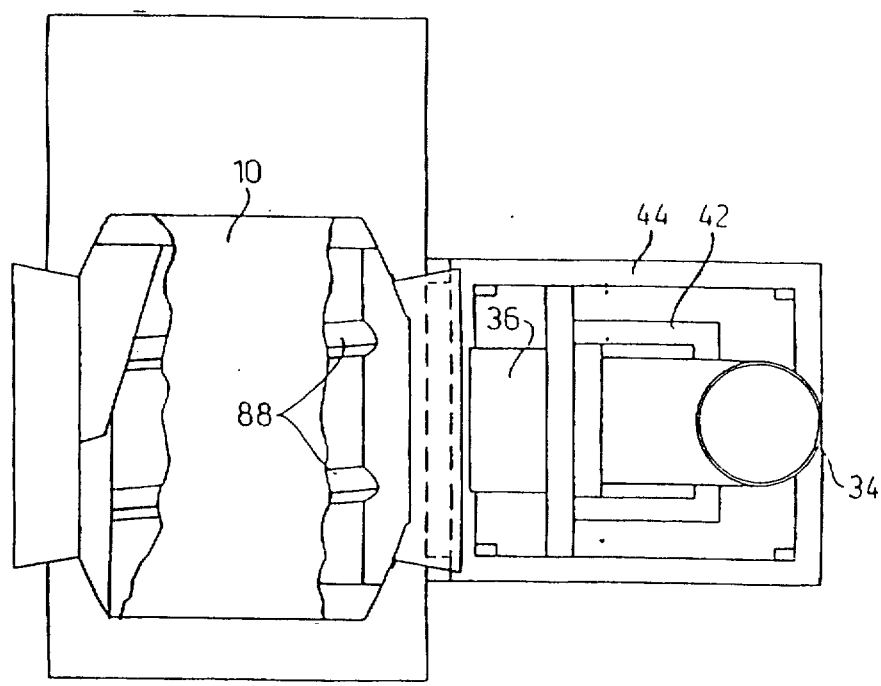

A similar overall solution is shown diagrammatically in FIG. 2. Those parts, which were described already in conjunction with FIG. 1, have the same reference numbers. In FIG. 2, the arrangement of the drum is the opposite to that of FIG. 1, the discharging opening 18 being on the left side and the filler opening 16 on the right side. Within the drum 10, the material to be treated is shown diagrammatically. Outside of the building, there is a cylindrical pressure vessel 46, which contains the liquid coolant, that is, nitrogen or carbon dioxide. After valves 50 and 52 are opened on the outside and the inside of the building, the coolant passes through pipeline 48, a hose section 54 and a pipe section 56 into the interior of the drum 10.

At the underside of the false ceiling 24, a spray pipe 58 is suspended, with which a coolant can be sprayed from the outside onto the drum 10. Above the false ceiling 24, the guidance of the exhaust pipe has been modified from that of the embodiment of FIG. 1. The exhaust pipe 28, emerging vertically upwards through the false ceiling 24, is connected T-shaped with a further pipe section 60, in which there are two blowers 62 and 64, which are disposed one behind the other and transport the gas, which is to be exhausted, from the exhaust pipe 28 above the false ceiling 24 first to the left and then vertically upwards through the roof 26 and finally to the right in FIG. 2. At the right end of the horizontal part of the pipe section 60, there is a vacuum-controlled supplementary air valve 66.

It can, moreover, be seen in FIG. 2 that the drum 10 lies on supporting and driving rollers 68, 70, which are on a common shaft 72, which can be rotated as indicated by arrow 74. Such shafts and rollers are on either side of the drum, so that the drum is supported securely and can be rotated correspondingly to the rotation of the shafts.

Figure 3:
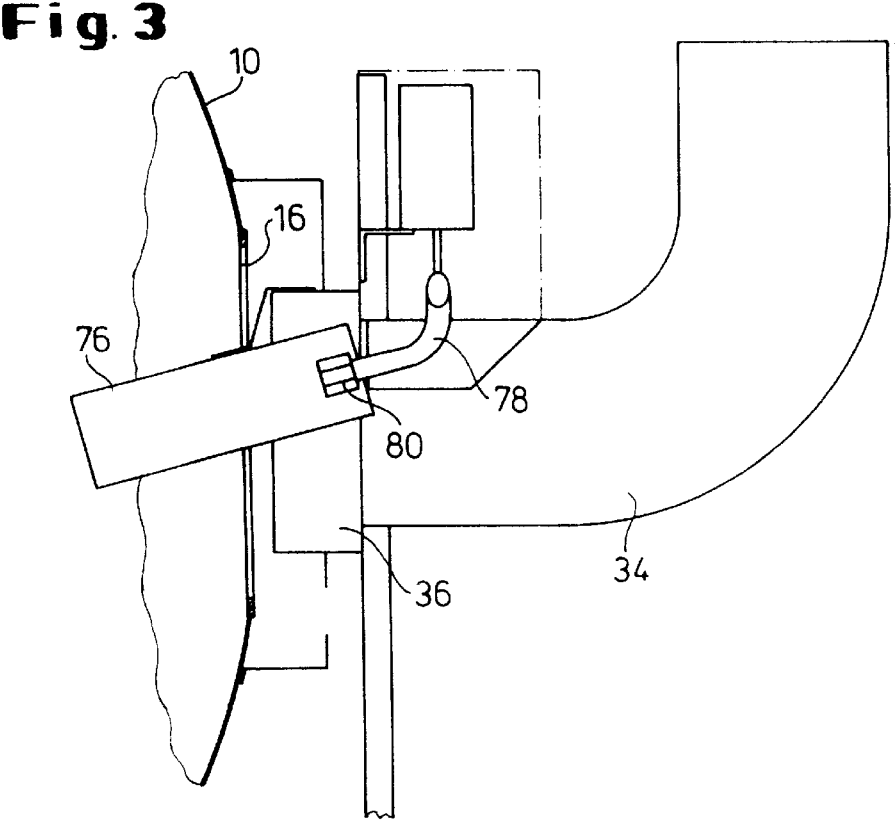
FIGS. 3 and 4 illustrate the supply of the coolant supply system in some detail.
Figure 4:
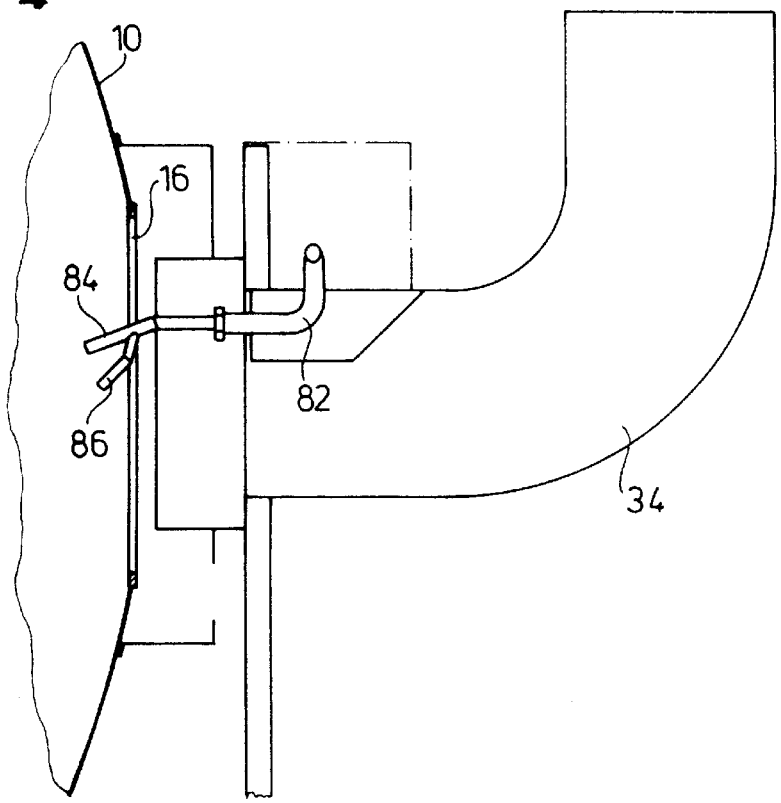

FIGS. 3 and 4 show two highly diagrammatic representations of the area of the inlet opening 16 of the drum 10. Moreover, FIGS. 3 and 4 show the pipe elbow 34 of the exhaust system and the collar 36.

FIG. 3 shows a so-called snow pipe 76, which enters the drum through the collar 36 in the upper region of the pipe elbow and is slightly inclined downwards from the right to the left in FIG. 3 and closed at the right end. A pipeline 78, at the end of which there is a nozzle 80 within the snow pipe, enters this closed end. Liquid carbon dioxide is emitted through this nozzle 80 and solidifies immediately to carbon dioxide snow within the snow pipe.

In the embodiment of FIG. 4, this system for supplying coolant is formed by a pipeline 82, which changes over into two nozzles 84, 86 within the drum 10, through which liquid nitrogen is emitted as coolant.

Figure 5:
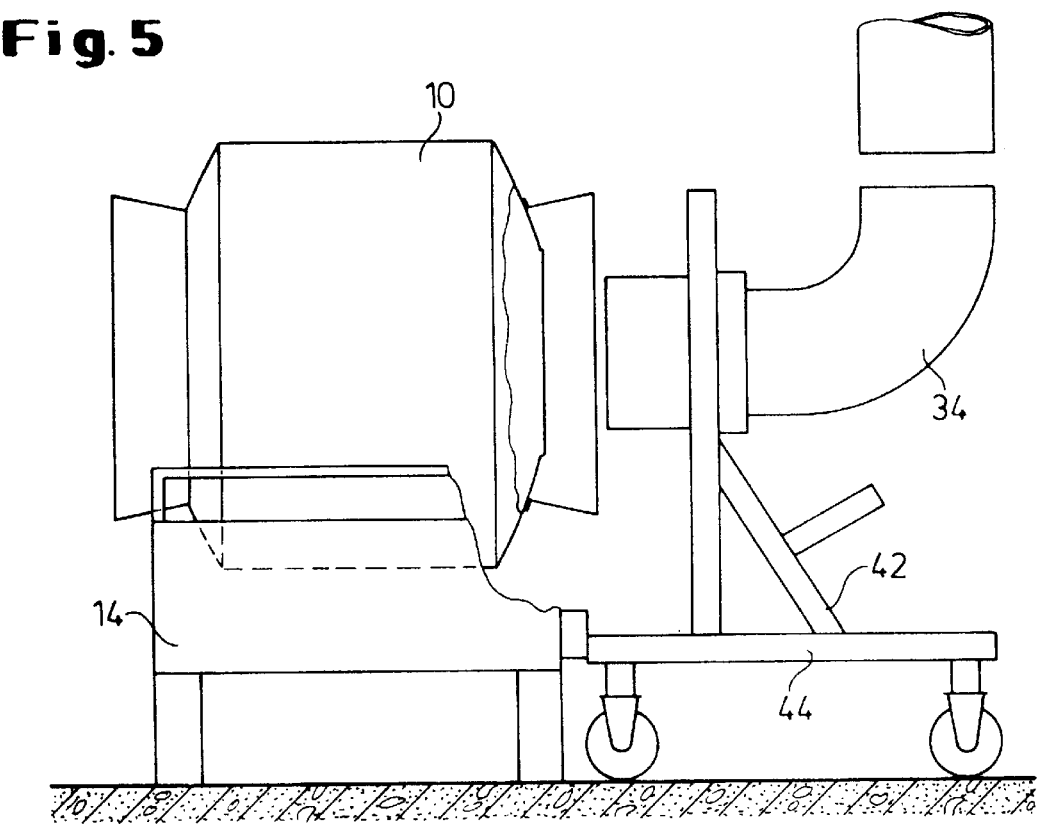
FIGS. 5 and 6 are a diagrammatic side view and a plan view of an inventive drum with a movable opening and an exhaust system.
Figure 6:
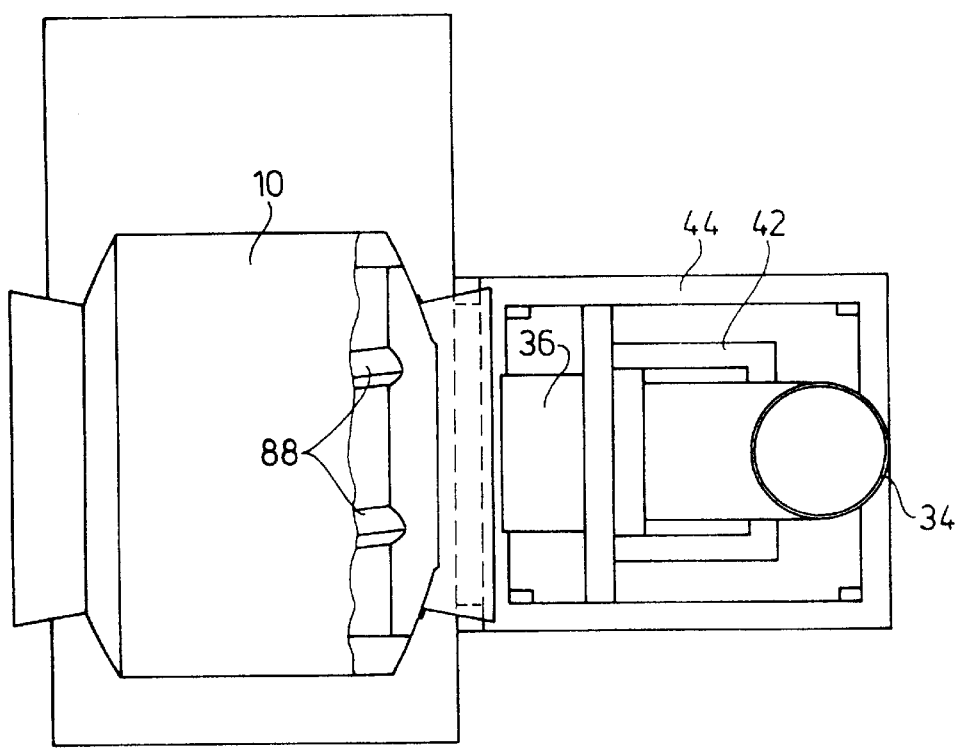

FIGS. 5 and 6 serve to supplement the explanation of some details, which have not been shown previously. On the one hand, FIG. 6 shows the frame 42 together with the carriage 44 in plan view. Moreover, the drum 10 in FIG. 6 is shown partially cut open, so that driving plates 88, which are formed on the inner surface shell and carry along the goods to be processed as the drum is rotated, can be recognized within the drum. An ejector blade is provided at driving plates 88 and is disposed in front of second opening 18.

In addition to the feeding devices for a coolant, such as carbon dioxide or nitrogen, shown in FIGS. 3 and 4, there is, in the region of the first opening 16, a feed pipe, which ends in a nozzle, for feeding the sauce into the drum. This feed pipe will be described later on.

It can be inferred from the previously explained drawings, that the front collar 36 is formed essentially only by a ring surrounding the corresponding end of the pipe elbow 34 of the exhaust pipe. Compared to the open area of the first opening 16, a considerable gap is left free. The apparatus thus works as an open system. Since an overpressure is avoided in every case in the drum due to the strong exhaustion of the evaporating coolant and moreover, due to the gap on the inlet side, the required liquids, that is, the coolant and the sauce, can be injected without hindrance.

Figure 7:
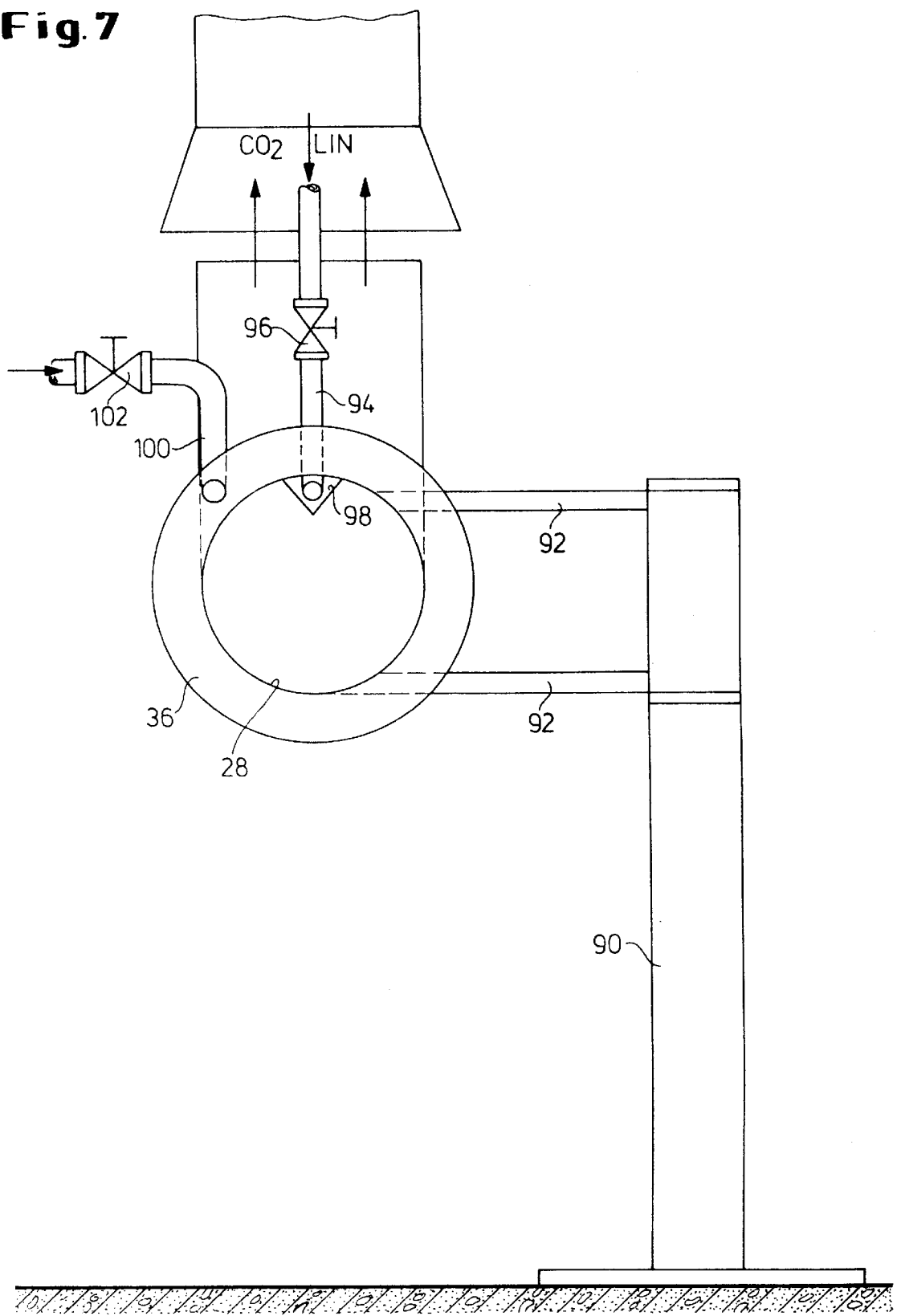
FIG. 7 is a diagrammatic partial representation and shows a view into the open end of the exhaust pipe.

To begin with, according to FIG. 7, the pipe elbow 34 of the exhaust pipe 28, in deviation from the previously described Figures, is mounted not on a carriage 44, but on a vertical post 90, with which the pipe elbow is connected over horizontal swiveling arms 92. The overall arrangement of exhaust pipe and/or pipe elbow and nozzles can therefore be swung to the side at the end of a cycle. In FIG. 7, a pipeline for supplying coolant is labeled 94. In this pipeline, there is a valve 96. As already indicated in FIGS. 3 and 4, the pipeline 94 is taken to an upper indentation 98 of the exhaust pipe, so that it arrives directly in the cross sectional area of the exhaust pipe through the opening in the drum 10. FIG. 7 moreover shows a pipeline 100, with a valve 102 for supplying sauce. This pipeline 100 enters the drum in the 10 o'clock position through a collar 36.

Figure 8:
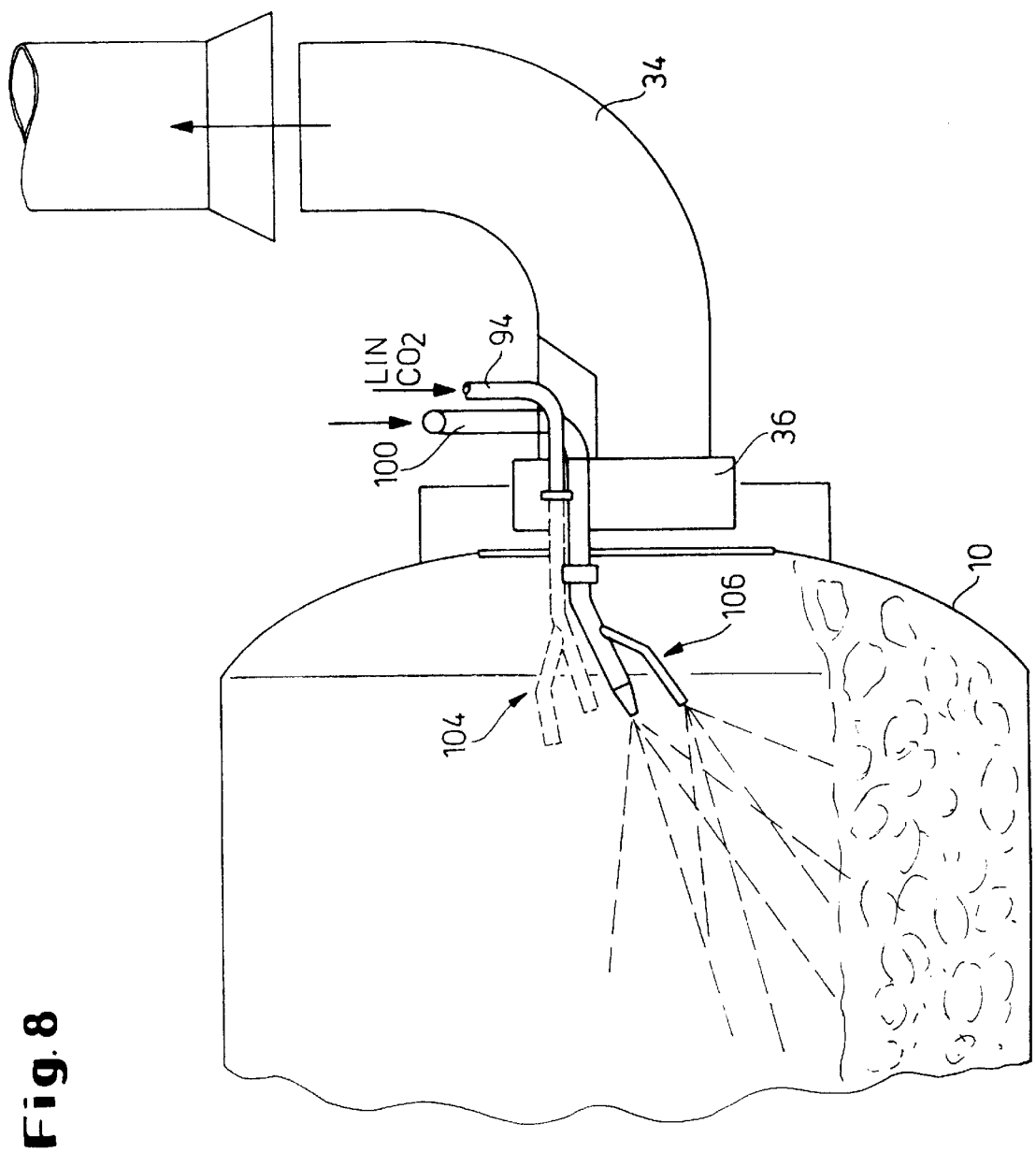
FIG. 8 is a partial side view of the drum and of the exhaust pipe in a partially sectional representation and FIG. 9 corresponds to FIG. 8, but shows a different embodiment.

The two pipelines are shown in side view in FIGS. 8 and 9. The two pipelines for coolant and sauce are also labeled 94 and 100 in these Figures. At the end of the pipeline, there is a so-called three-finger nozzle 104 for feeding in the liquid nitrogen. A similar three-finger nozzle 106 is provided at the end of the pipeline 100. Such a nozzle is suitable for feeding in viscous sauces.

FIG. 9 differs from FIG. 8 inasmuch as a lance 108 is provided instead of the three-finger nozzle 106. The front end region of the lance 108 is bent downwards at an angle. At the underside of the lance 108, there is a number of fan nozzles 110.

Admittedly, the inventive apparatus also offers the possibility of merely freezing the food products, which are to be processed. However, the special advantage lies therein that the apparatus permits a freezing process as well as a mixing process, during which the products are coated with sauce and the coating, while constantly being distributed, adheres in a frozen state to all solid parts.

In contrast to conventional drums, the drum is relatively short, so that the coolant, sprayed in from the inlet side, very rapidly comes into contact with all of the filling material. For example, the cylindrical middle part of the drum may have a diameter of 1,000 mm and a length of only 600 mm. The small length of the drum, the intensive exhausting and the correspondingly rapid supply of coolant offer the possibility of controlling the treatment and freezing relatively accurately and, with that, maintaining an accurately definable temperature-time profile.

It was already pointed out that, for example, an excessively long freezing time can be responsible for the individual product parts sticking, agglomerating or even breaking. Moreover, a shock-like freezing process is advantageous for the adhesion of the sauce to the individual parts of the product. However, this presupposes that the sauce is fed in very rapidly. The feeding in of the sauce can take place without hindrance. On the other hand, in the case of conventional apparatuses, for which only one opening is provided and an ejector blade is required in the region of this one opening, such feeding of sauce can occasionally be hindered by this ejector blade.

The inventive apparatus offers the advantage that, in a single plant, loose foods, frozen while rolling, can be produced, which can be coated with any adjustable amount of sauce, marinade, oil emulsion and/or seasoning emulsion and similar materials in such a manner that, in the end, the individual pieces of the respective food, as before, do not adhere together, that largely the same proportion of coating adheres to each piece and that the individual pieces are not damaged. The freezing process and the coating process can take place timewise independently of one another with respect to time, that is, for example, simultaneously or in any sequence alternately.

A coherent arrangement of an exhaust pipe, a nozzle for feeding a coolant, particularly liquid nitrogen or carbon dioxide, and a nozzle or lance for feeding sauce, can be swiveled or moved in front of one of the two openings of the drum. The entry area of the exhaust pipe occupies essentially the whole cross sectional area of the corresponding opening of the drum, so that coolant, which has gone over into the gaseous state, can be exhausted rapidly. In the feed line for the sauce, there may be a sauce pump, which is connected with a reservoir container for sauce or also with a sauce mixer or cooker. The nozzles and/or lances for feeding the coolant and the sauce can easily be exchanged and can therefore be exchanged readily for cleaning purpose or for changing over to a different working program.

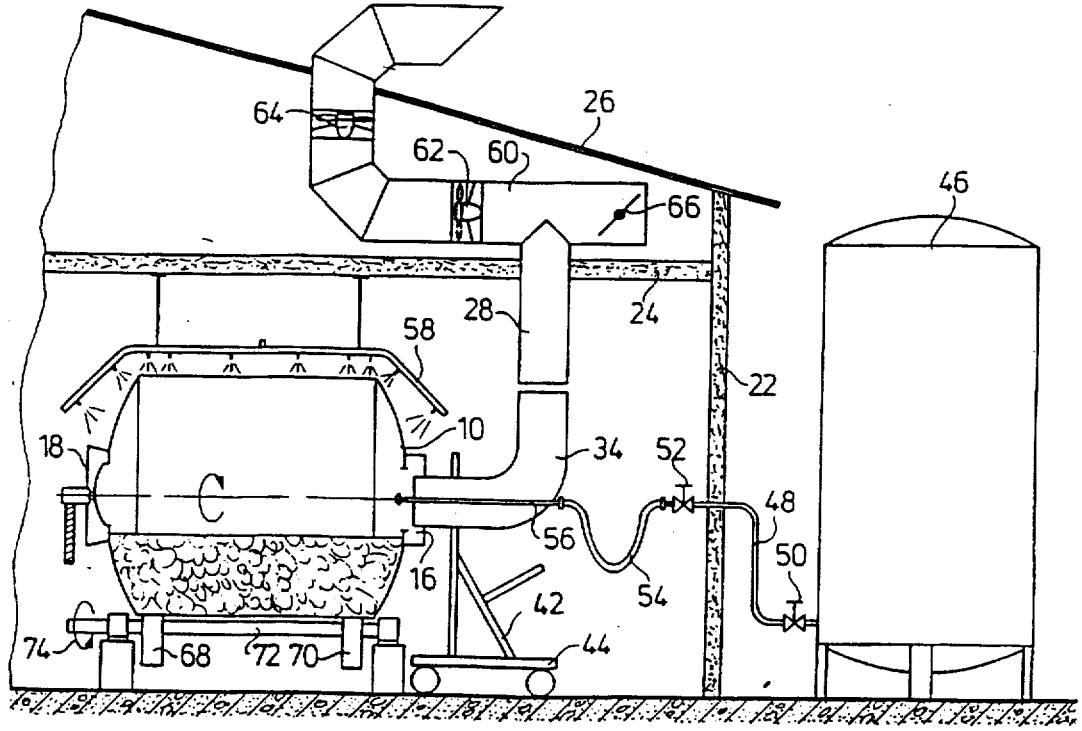

What is claimed is:

1. An apparatus for coating food products with sauce while simultaneously deep freezing them, comprising:
    a rotatable drum oriented in a horizontal position, and having an inner wall surface on which a driving plate is disposed, said drum having a first opening at an end face thereof, and a second opening on an opposite end face,
    an ejector provided at the driving plate and disposed in front of the second opening,
    a nozzle mounted in the first opening for feeding a coolant into the drum,
    a further nozzle, mounted in the first opening, for injecting sauce into the drum,
    an exhaust pipe, which occupies essentially an entire cross sectional area of the first opening and is intended to exhaust gaseous coolant, and
    a movable holding device which accommodates the exhaust pipe and permits the exhaust pipe to be moved between a position immediately in front of the first opening and a retracted position.

2. The apparatus of claim 1, wherein the exhaust pipe, in the region of the first opening, has a section which can be separated from a remainder of the exhaust pipe and is connected with the first opening.

3. The apparatus of claim 1, wherein the holding device for the exhaust pipe has a post with a swiveling arm which permits the exhaust pipe to be swung back and forth with respect to the first opening.

4. The apparatus of claim 1, further comprising a blower mounted in the exhaust pipe .

5. The apparatus of claim 3, wherein a lower section of the exhaust pipe is formed by a pipe elbow having a horizontal leg which can be connected with the first opening of the drum and a perpendicular, upwardly rising leg can be connected with the help of a sliding sleeve with a further, vertically rising part of the exhaust pipe.

6. The apparatus of claim 1, wherein the nozzle for feeding the coolant is connected with the exhaust pipe and can be moved between a position within the first opening and a retracted position.

7. The apparatus of claim 1, wherein an end of the exhaust pipe facing the first opening is surrounded by a collar, and further comprising a pipeline extending through the collar for feeding sauce, and which terminates in a nozzle that enters an interior of the drum.

8. The apparatus of claim 1, wherein said coolant includes liquid nitrogen.

9. The apparatus of claim 1, wherein said coolant includes liquid carbon dioxide.

10. The apparatus of claim 2, further comprising a blower mounted in the exhaust pipe.

11. The apparatus of claim 3, further comprising a blower mounted in the exhaust pipe.

12. The apparatus of claim 4, wherein a lower section of the exhaust pipe is formed by a pipe elbow having a horizontal leg which can be connected with the first opening of the drum and a perpendicular, upwardly rising leg can be connected with the help of a sliding sleeve with a further, vertically rising part of the exhaust pipe.

13. The apparatus of claim 2, wherein the nozzle for feeding the coolant is connected with the exhaust pipe and can be moved between a position within the first opening and a retracted position.

14. The apparatus of claim 3, wherein the nozzle for feeding the coolant is connected with the exhaust pipe and can be moved between a position within the first opening and a retracted position.

15. The apparatus of claim 4, wherein the nozzle for feeding the coolant is connected with the exhaust pipe and can be moved between a position within the first opening and a retracted position.

16. The apparatus of claim 5, wherein the nozzle for feeding the coolant is connected with the exhaust pipe and can be moved between a position within the first opening and a retracted position.

17. The apparatus of claim 2, wherein an end of the exhaust pipe facing the first opening is surrounded by a collar and further comprising a pipeline extending through the collar for feeding sauce, and which terminates in a nozzle that enters an interior of the drum.

18. The apparatus of claim 3, wherein an end of the exhaust pipe facing the first opening is surrounded by a collar and further comprising a pipeline extending through the collar for feeding sauce, and which terminates in a nozzle that enters an interior of the drum.

19. The apparatus of claim 4, wherein an end of the exhaust pipe facing the first opening is surrounded by a collar and further comprising a pipeline extending through the collar for feeding sauce, and which terminates in a nozzle that enters an interior of the drum.

20. The apparatus of claim 5, wherein an end of the exhaust pipe facing the first opening is surrounded by a collar and further comprising a pipeline extending through the collar for feeding sauce, and which terminates in a nozzle that enters an interior of the drum.

\* \* \* \* \*

UNITED STATES PATENT AND TRADEMARK OFFICE
CERTIFICATE OF CORRECTION

PATENT NO. : 5,911,827
DATED : June 15, 1999
INVENTOR(S) : Peter Heller

It is certified that error appears in the above-indentified patent and that said Letters Patent is hereby corrected as shown below:

Please substitute the attached Figs. 2 and 6 for those printed in the above-identified patent.

Signed and Sealed this

Thirtieth Day of November, 1999

Attest:

Q. TODD DICKINSON

Attesting Officer

Acting Commissioner of Patents and Trademarks

United States Patent [19]
Heller

[11] Patent Number: 5,911,827
[45] Date of Patent: Jun. 15, 1999

[54] APPARATUS FOR COATING FOOD PRODUCTS WITH SAUCE

[75] Inventor: Peter Heller, Augustdorf, German Dem. Rep.

[73] Assignee: Peter Heller GmbH, Augustdorf, Germany

[21] Appl. No.: 09/007,549

[22] Filed: Jan. 15, 1998

[30] Foreign Application Priority Data

Jan. 15, 1997 [DD] German Dem. Rep. ......... 197011578

[51] Int. Cl.$^6$ .................................................. A23G 3/00
[52] U.S. Cl. ........................... 118/19; 118/20; 118/24; 118/28; 118/29; 118/69; 118/320; 118/416; 118/417; 99/517
[58] Field of Search .................. 118/19, 20, 24, 118/28, 29, 69, 416, 417, 320; 99/517, 348; 426/302, 295, 524

[56] References Cited

U.S. PATENT DOCUMENTS

| | | |
|---|---|---|
| 3,607,313 | 9/1971 | Roth ................................. 426/302 |
| 4,326,480 | 4/1982 | Glatt ................................. 118/19 |
| 4,478,861 | 10/1984 | Montgomery et al. .......... 426/524 |
| 5,589,214 | 12/1996 | Palm ................................. 426/524 |

FOREIGN PATENT DOCUMENTS 4141448  6/1993  Germany.

*Primary Examiner*—Laura Edwards
*Attorney, Agent, or Firm*—Richard M. Goldberg

[57] ABSTRACT

An apparatus for coating food products with sauce while simultaneously deep freezing them comprises a rotatable drum (10) in a horizontal position, on the inner wall surface of which a driving plate is disposed and which has an opening (16) at an end face. The apparatus furthermore comprises a second opening (18) on the opposite end face, an ejector, which is provided at the driving plate (88) and disposed in front of the second opening (18), a nozzle (80, 84, 86), mounted in the first opening (16), for feeding a coolant, particularly in the form of liquid nitrogen or liquid carbon dioxide, into the drum, a further nozzle, mounted in the first opening (16), for injecting sauce into the drum, an exhaust pipe, which occupies essentially the whole cross sectional area of the first opening (16) and is intended to exhaust gaseous coolant, as well as a movable holding device (42, 44), which accommodates the exhaust pipe (34, 28) and permits the exhaust pipe to be moved between a position immediately in front of the first opening and a retracted position.

20 Claims, 7 Drawing Sheets